April 22, 1969     L. A. ULMSCHNEIDER     3,439,881
ONE-PIECE MOLDED SPOOL, WINDING CORE OR THE LIKE
Original Filed Oct. 8, 1963
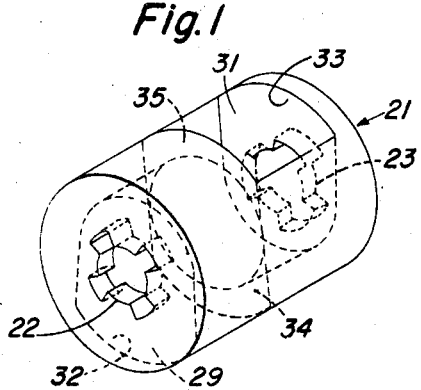
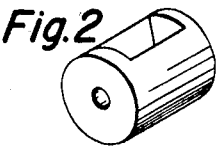
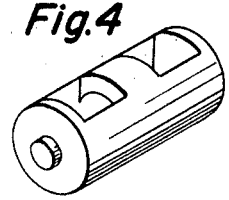
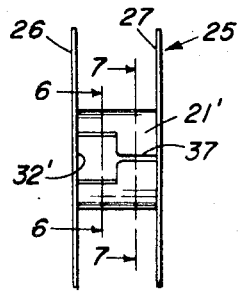
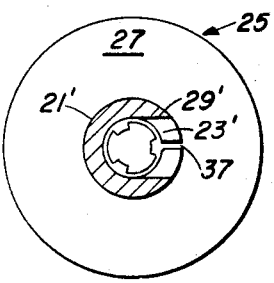
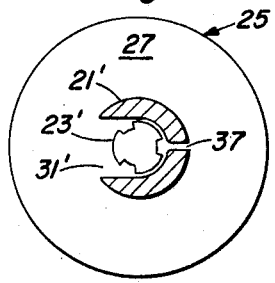
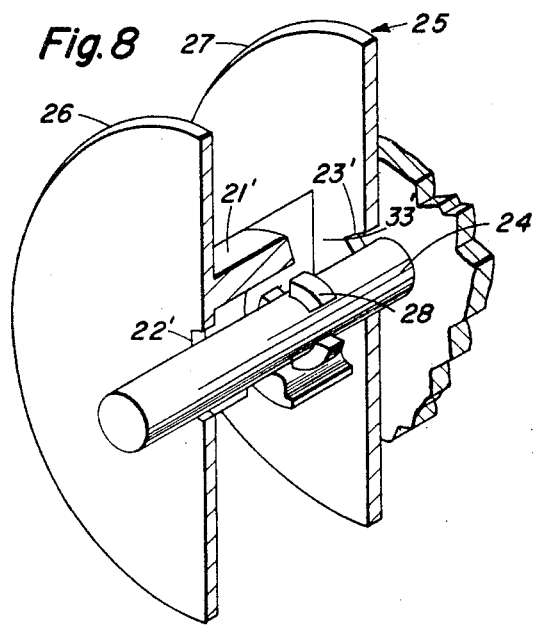
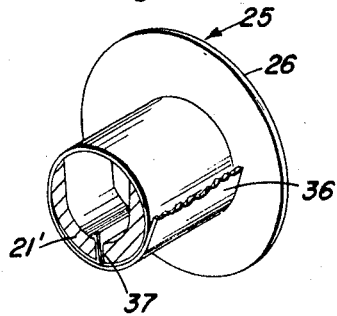
LAWRENCE A. ULMSCHNEIDER
INVENTOR.
BY R. Frank Smith
Robert F. Crocker
ATTORNEYS

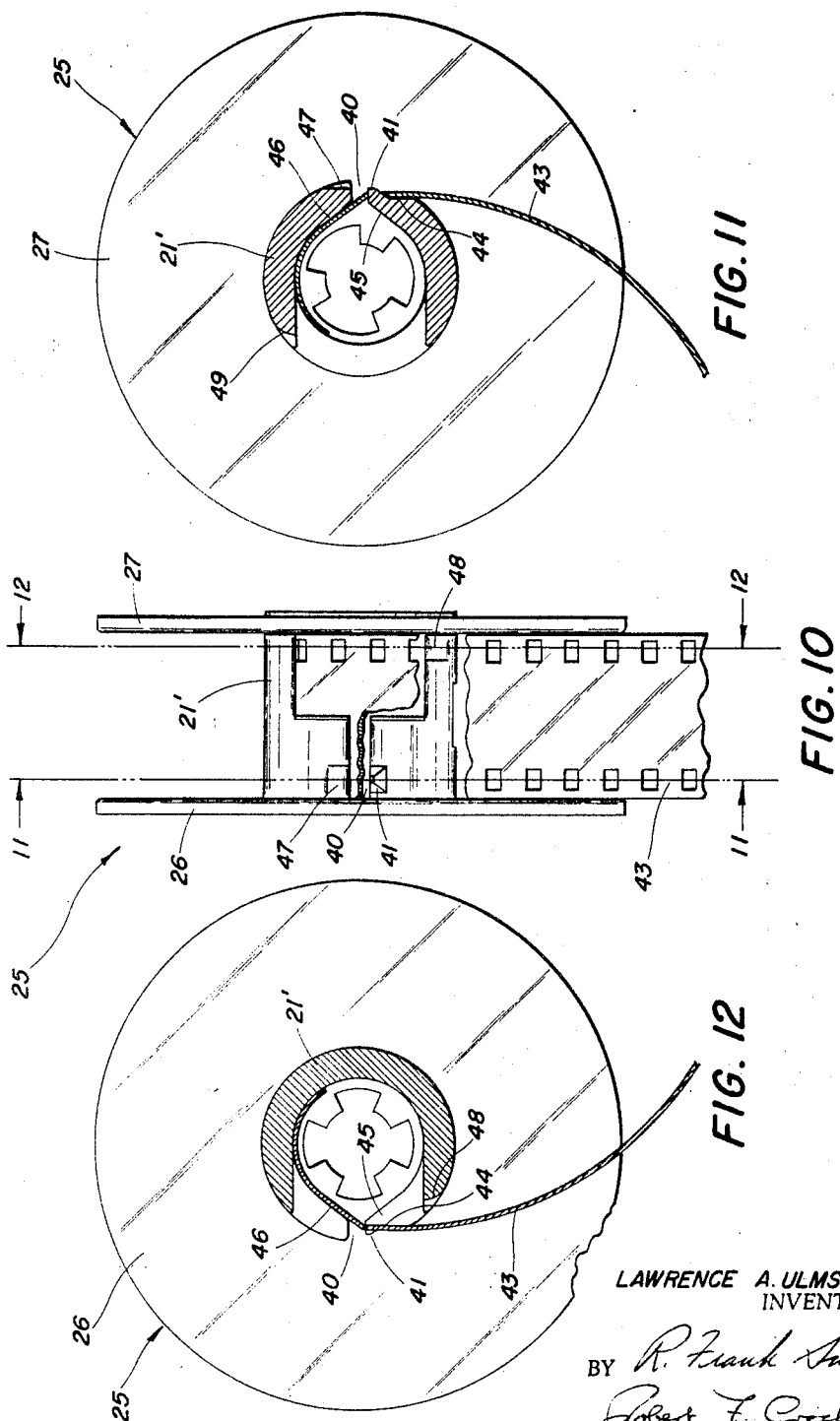

United States Patent Office 3,439,881
Patented Apr. 22, 1969

3,439,881
ONE-PIECE MOLDED SPOOL, WINDING
CORE OR THE LIKE
Lawrence A. Ulmschneider, Rochester, N.Y., assignor to
Eastman Kodak Company, Rochester, N.Y., a corporation of New Jersey
Continuation of application Ser. No. 314,711, Oct. 8, 1963, which is a continuation-in-part of application Ser. No. 79,792, Dec. 30, 1960. This application Aug. 7, 1964, Ser. No. 388,258
Int. Cl. B65h 17/02
U.S. Cl. 242—68.5                                    19 Claims This application is a continuation of my co-pending application Ser. No. 314,711, filed Oct. 8, 1963, now abandoned, and which, in turn, is a continuation-in-part of my now abandoned application Ser. No. 79,792, filed Dec. 30, 1960.

This invention relates to a one-piece molded winding core adapted to accommodate a strip of elongated material, and to spools, and particularly photographic film spools, comprising such cores with integral flanges formed thereon in the molding operation.

In designing a winding core or a spool comprising a flanged winding core, it is rarely possible to reduce the diameter of the core beyond a certain point because of considerations quite independent of the physical strength of the core. Such considerations include the flexibility of the material to be wound, its elastic limit, its tendency to curl, limitations on the rotational speed of the core during winding and unwinding etc. Where such considerations dictate a core of substantial diameter, a solid core construction may obviously be undesirable both from the standpoint of excessive weight and also because of the expense of the material of which the core is formed. Thus, while a common wooden thread spool is fairly practical in spite of its unnecessary bulkiness, the cost of material for a solid plastic spool of exactly the same form would be prohibitive.

One method that has been employed in the past to reduce the bulkiness and cost of molded cores is to provide lightening holes extending axially into the ends of the core in addition to the hole by means of which the core is supported. In molded cores of this type these lightening holes are formed during the molding operation by tapered plugs which are located within the mold cavity during the molding operation and then axially withdrawn from the finished core. While this procedure substantially reduces the amount of material required to produce a core, and thereby the weight and cost of the core, it is not satisfactory for all purposes. One obvious disadvantage is that the ends of such cores are not well adapted to having labelling indicia molded or printed directly thereon, and therefore must be labelled by a more expensive method if such labelling is required. A much more serious disadvantage of this approach is encountered in producing a motion picture film spool of the type in which the ends of the flanged winding core are provided with differently splined center holes, adapted to cooperate with enlarged splined segments or radially projecting splines on the supporting spindles to insure that the spool will be faced in one direction when mounted on the supply spindle and in the opposite direction when mounted on the takeup spindle as shown in Patent 1,941,522 issued to O. Wittel on Jan. 2, 1934. Such a core must necessarily be provided with an internal cavity large enough to freely accommodate the enlarged splined segment of the supply spindle to allow the core to rotate freely on this spindle when the stationary splined segment is located within the core. In other words, the core must have an internal cavity of sufficient size to include the space defined by the central portion of an imaginary cylinder located within the core between and coaxial with the splined end holes and of greater diameter than the largest cylindrical shaft that can be axially extended through either of the splined end holes. Film spools having cores of this type are presently formed by attaching a flange having a splined center hole to each end of a tubular member. The advantages of molding such a spool or core in a single operation are obvious. The above-described method of providing axial lightening holes in the core cannot, however, be employed to form an internal cavity of this type while still retaining the center supporting holes in the ends of the core because of the requirement that such lightening holes be parallel and in axial relation to the core. Furthermore, it is impossible to form the enlarged internal cavity by means of a solid coring plug removable through the splined supporting hole in one end of the core because that part of the plug that forms the cavity must necessarily be larger than the splined hole through which it would have to be withdrawn. While it might be conceivable to utilize some type of expandable plug which could be collapsed and withdrawn through the splined hole, this approach is entirely impractical because of the necessarily complex structure of such a plug and because of the rigidity required of the plug in order to withstand displacement of deformation under the high pressures to which it is subjected during the molding operation.

According to the present invention, the required internal cavity is provided in the molded core by means of one or more holes extending radially into the core through the cylindrical surface thereof. These holes are formed during the molding operation by solid tapered plugs mounted on portions of the mold movable radially with respect to the core. While this technique does not provide a core having an uninterrupted cylindrical surface, the holes do not destroy the cylindricality of the convolutions of photographic film or other analagous types of web material wound thereon.

One object of the invention is to reduce the bulk of a one-piece molded winding core.

Another object of the invention is to provide a one-piece molded winding core having a supporting hole in each end thereof and an internal cavity of sufficient size to include the space defined by an imaginary cylinder located within the core between and coaxial with the end holes and of greater diameter than the diameter of the largest cylindrical shaft that can be axially extended through either of the end holes.

Another object of the invention is to provide a one-piece molded spool comprising such a winding core having flanges integrally formed at the ends thereof.

These and other objects and features of the invention will be more fully understood from the following detailed description when read in conjunction with the drawings in which:

FIG. 1 is an enlarged perspective view of a one-piece molded winding core made in accordance with a preferred embodiment of the present invention and adapted for use in motion picture apparatus and in which the internal cavity is formed by two intersecting radial holes, the internal structure of the core being shown in broken lines;

FIG. 2 is a perspective view of an alternative form of a one-piece molded winding core of the type shown in FIG. 1 in which the internal cavity is formed by only one radial hole;

FIG. 3 is a cross sectional view of one embodiment of a core of the type shown in FIG. 2;

FIG. 4 is a perspective view of still another alternative form of a one-piece molded winding core of the type shown in FIG. 1 in which the internal cavity is formed by three intersecting radial holes, only two of which are shown;

FIG. 5 is a side elevation of a molded one-piece flanged spool constructed in accordance with a preferred embodiment of the invention;

FIG. 6 is a sectional front elevation of the spool taken substantially on the line 6—6 of FIG. 5;

FIG. 7 is a sectional front elevation of the spool taken substantially on the line 7—7 of FIG. 5;

FIG. 8 is an enlarged perspective sectional view of the spool shown in FIGS. 5, 6 and 7 mounted on a spindle of the type employed in motion picture cameras;

FIG. 9 is a perspective sectional view of a spool according to the preferred embodiment of the invention and showing several convolutions of photographic film or similar material wound thereon;

FIG. 10 is a side elevation of a molded one-piece flanged spool having a preferred form of web retaining slot;

FIG. 11 is a sectional front elevation of the spool taken substantially on line 11—11 of FIG. 10; and FIG. 12 is a sectional front elevation of the spool taken substantially on the line 12—12 of FIG. 10.

Referring now to the drawings, FIG. 1 shows a flangeless core 21 adapted to provide a cylindrical support for a roll of web material wound thereon. Due to the structural similarity between the core shown in FIG. 1 and the core embodied in the spools shown in FIGS. 5–12, the elements of the spool core are designated in FIGS. 5–12 by primed numerals corresponding to those numerals shown in FIG. 1.

The core shown in FIG. 1 is provided with differently splined supporting holes 22 and 23 adapted to support the core on the above-mentioned type of splined spindles commonly used in motion-picture apparatus. As previously mentioned, a spool or winding core adapted to be mounted on such spindles must have an enlarged internal cavity. This requirement can best be understood by referring to FIG. 8 which illustrates a supply spindle 24 of this type upon which is mounted a spool 25 comprising a core 21' of substantially the same construction as that shown in FIG. 1 with flanges 26 and 27 integrally molded thereon. In order for the spool to rotate freely about the supply spindle 24, it is obvious that the internal cavity must be large enough to freely accommodate the enlarged splined portion 28 of the spindle.

Referring again now to FIG. 1, the internal cavity within the core is formed by intersecting holes 29 and 31 which extend radially into the core from opposite sides thereof and which communicate with the respective splined holes 22 and 23. Each of the holes presents a substantially rectangular cross section when viewed in a direction radial to the core along the radial center line of the hole, as is most clearly shown in FIG. 5. As used hereinafter with regard to the configuration of the radial holes in the core, a reference to the length of such a hole refers to the distance between the ends of the hole measured parallel to the core axis, and a reference to the width of the hole refers to the distance between the lateral sides of the hole measured perpendicularly to the axis of the core and to the axis of the hole itself. As viewed along the axis of the core, each of the radial holes presents a U-shaped profile with the U astraddle the axis of the core and straight lateral sides of the hole diverging slightly toward the open end. In other words, the profile of each radial hole is provided with a slight amount of draft to facilitate withdrawing the hole-forming dies from the finished core. The semicircular portion of the U-shaped profile is approximately coaxial with the core and is of a greater radius than the major radius of the splined holes in the core ends. In order to effect a maximum reduction in the amount of material required to mold the core, the profile of the holes should be as large as possible without reducing the wall thickness of the core to a point where its rigidity and strength are impaired. The outward ends 32 and 33 of holes 29 and 31 respectively are flat surfaces in planes perpendicular to the axis of the core. While it might be desirable in some instances to provide a slight amount of draft to these surfaces, the flexibility of the ends of the core when these ends are relatively thin makes such draft unnecessary. The inner ends 34 and 35 of the radial holes are flat surfaces in a common plane so disposed that the length of each hole at its open end is greater than its length at its base. The reason for locating the common plane in this manner is a function of the mechanical features of a mold for fabricating the core. Since these ends of the holes are coplanar, it is obvious that the resulting cavity includes a cylindrical space extending between ends 32 and 33 of holes 29 and 31 respectively, coaxial with the core and of the same radius as that of the semicircular portion of the profile of the radial holes. As previously discussed, and as is readily apparent from FIG. 1, a solid plug of sufficient size to form an internal cavity of the same dimensions could not possibly be withdrawn from the finished spool through either of the splined end holes.

Although the radial holes 29 and 31 cause discontinuities in the cylindrical surface of the core, a convolution of web material wound thereon will nevertheless retain a cylindrical form if the web comprises a strip of material, such as photographic film, which exhibits the property of being relatively rigid in one direction when flexed in a transverse direction and if the web is cylindrically supported along at least one edge adjacent each radial hole. This ability of photographic film and similar materials to span the discontinuities in the cylindrical surface is illustrated in FIG. 9, which shows a sectional view of the preferred embodiment of the invention comprising spool 25 with a core 21' similar to that shown in FIG. 1, having a convolution of photographic film 36 or similar material wound thereon, one flange of the spool having been removed for illustrative purposes. As is evident from this figure, the cylindricality of the convolution of film is substantially unaffected by the radial holes in the core. If, however, a convolution of some material that does not exhibit this property, such as rubber or soft gauze, were wound about the core under any appreciable tension, the convolution would not assume a completely cylindrical form because such materials would sag into the radial holes in the core. The same effect would likewise occur if strand material such as string were wound upon the core. The usefulness of the core is not necessarily limited to winding materials such as photographic film, however, inasmuch as many applications do not require that the convolutions be absolutely cylindrical. If uniform convolutions are required of a material that will not of itself span the holes in the core, for example strand material or stretchable web material, it is possible to wind such material on the core in uniform convolutions by previously winding onto the core one or more convolutions of some material that will span the holes and then winding the other material thereon. The material initially wound upon the core may, if desired, be glued or otherwise permanently affixed to the core to provide a permanent cylindrical surface adapted for winding all kinds of elongated material. Another alternative would be to provide a resilient metal clip which could be snapped over the core to cover the radial hole or holes. This clip or the material initially wound on the core might also be used to secure the end of the web or strand to be wound thereupon. If uniform convolutions are not required, it is obvious that any kind of elongated material may be wound directly on the core.

Referring again now to the preferred embodiment of the invention, FIGURES 5 through 9 show a spool 25 comprising a core 21' substantially like that shown in FIGURE 1 and previously described, and having radial flanges 26 and 27 integrally molded thereon with the outwardly facing flat surfaces of the flanges co-planar with the ends of the core and with the inwardly facing flat surfaces of the flanges co-planar with the corresponding outward ends 32' and 33' of the radial holes 29' and 31'. The only significant difference between the core of this spool and the core shown in FIG. 1 resides in a narrow slot 37 communicating with the base of one of the radial holes, i.e., 31'. As shown in FIG. 9, this slot provides a means for holding the innermost end of a strip of film as the film is wound onto the spool. The slot could, of course, be in non-linear form to increase the grip on the film.

An alternative, preferred form of web retaining slot is illustrated in the spool embodiment of FIGS. 10–12. Such spool has a core 21' and flanges 26 and 27 substantially the same as the spool of FIGS. 5–7. The differences are in the web retaining slot 40 which has an adjacent lug or tooth 41 for engaging and holding a perforation of a film strip 43 insertable into the slot 40. As best seen in FIGS. 11 and 12, the outer cylindrical surface of the core 21' is formed to define a chamfer 44, and internal surfaces 45 and 46 are tapered toward slot 40 in deviation from a normal U-shape so as to allow positioning of a film strip 43 in the slot 40 at an angle oblique to the core radius intersecting slot 40. With such an arrangement, the end of film strip 43 may be positioned in slot 40 at an angle approaching the tangent to the core at the slot 40. Film strip 43 can thus remain clear of a spindle supporting the spool and particularly splines on a segment of such a spindle. Another way that the spool of FIGS. 10–12 differs from the spool of FIGS. 5–7 is in cam ramps 47 (FIGS. 10 and 11), 48 (FIGS. 10 and 12) and 49 (FIG. 11) that are provided adjacent slot 40 and the edges of the radial recesses to index the spool for certain automatic threading cameras, so that the spool may be properly oriented for automatically receiving the end of film strip 43.

The relation of the spool and its internal structure to a spindle of the type upon which it is adapted to be mounted is shown in FIG. 8, as previously discussed. The illustrated relation of the flanges to the core is only illustrative since the ends of the core could obviously project beyond the flanges or vice versa without departing from the spirit of the invention. Since the inwardly facing surfaces of the flanges of the illustrated spool are co-planar with the corresponding outward ends of the radial holes, it is obvious that the film strip is cylindrically supported adjacent only one end of each hole rather than adjacent both ends as would be the case if a web as wide as the length of the core shown in FIG. 1 were wound on that core. While it might be desirable for some applications to space the outward ends of the radial holes in the spool from the inwardly facing surfaces of the corresponding flanges to provide a web supporting surface adjacent both ends of each radial hole, this additional support has proven unnecessary for motion picture film spools because the rigidity of the film enables it to span the radial holes when cylindrically supported adjacent only one end of each hole. Although a film spool having such an additional supporting surface adjacent the flanges could be utilized with the type of spindle shown in FIG. 8, which has the splined portion of the spindle centrally located, such a spool could not be used in all motion picture cameras adapted to use splined portion of the mounting spindle in some of these cameras is so located as to be immediately adjacent the inner surface of the metal flange of the conventional film spool.

While the foregoing description is directed to a winding core or spool having two intersecting radial holes and specifically adapted for use in motion picture apparatus, it should be understood that the invention is not limited to this type of embodiment. FIG. 2, for example, shows a winding core having only a single radial hole and circular end holes adapted to mount the core on a cylindrical shaft. As shown in FIG. 3 the radial hole could extend completely through the core without affecting the utility of the core. FIG. 4 shows another embodiment having three radial holes, only two of which are shown, and having axial supporting pins on the ends thereof to support the core in appropriate trunnions. Obviously, the core may be made in any length and may have any number of radial holes in the core thereof. If the only purpose for which the radial holes are employed is to reduce the mass of the core, the holes need not intersect each other within the core. The exact configuration of the radial holes is not critical so long as they are so shaped as to be capable of being formed by coring members radially removable from the finished core. Holes of the approximate shape and disposition shown in the drawings are generally superior for most applications, however, in that they eliminate a maximum amount of material while still preserving the strength and general cylindrical form of the core. Although the cores described are designated as winding cores, it should be understood that this term does not limit the invention to only those cores upon which successive convolutions of elongated material are to be wound but also encompasses the use of such cores as rollers or guides in winding or feeding apparatus.

The invention has been described in detail with particular reference to preferred embodiment thereof, but it will be understood that variations and modifications can be effected within the spirit and scope of the invention as described hereinabove and as defined in the appended claims.

What I claim and desire to secure by Letters Patent of the United States is:

1. A flanged photographic film spool molded in one piece and having a hollow core adapted to be coaxially supported on a spindle, a segment of which has a radially projecting spline, said core comprising: a one-piece molded body whose extremities approximately define a right cylinder, said body having a first axial hole in one end thereof and a second axial hole in the opposite end thereof, said first and second axial holes being adapted to engage said spindle to support said body coaxially therewith; internal surfaces defining a plurality of recesses spaced in axial contiguity along said body and extending radially into said body so as to communicate with each other, those of said recesses that are axially conterminous being diametrically opposed to one another and each of said recesses being axially offset from both of said ends; a first one of said recesses directly communicating with said first axial hole; a second one of said recesses directly communicating with said second axial hole; and said internal surfaces cooperating within said body to form an internal cavity continuous between said axial holes and including a space extending axially of said body and having a diameter sufficiently large to rotationally receive the splined segment of said spindle.

2. A spool according to claim 1 provided with an uninterrupted cylindrical surface which is continuous between the ends of the core, said surface being defined by a covering material wrapped about said core.

3. A construction according to claim 2 in which said covering material is permanently affixed to said core and has the property of being relatively rigid in one direction when flexed in a transverse direction.

4. A molded one-piece photographic film spool comprising:
  (a) a core formed of a moldable material the external surfaces of which are approximately defined by a right cylinder having first and second external end surfaces, the material forming said first and second end surfaces being configured to define coaxial apertures adapted to receive a supporting spindle a segment of which has a radially projecting spline, said spindle extending between said external end surfaces and said spline being disposed between said first and second end surfaces when said spool is operatively mounted on said spindle;
  (b) co-planar central internal surfaces, the plane of which is approximately perpendicular to the axis of said core and located approximately midway between the axial ends of said core;
  (c) a first internal end surface substantially parallel to said first external end surface and communicating with the aperture in the material forming said first external end surface;

(d) a first internal, generally U-shaped surface astraddle the axis of said core and communicating with said cylindrical external surface and extending axially between said first internal end surface and the plane of said central internal surfaces;

(e) a second internal end surface substantially parallel to said second external end surface and communicating with the aperture in the material forming said second external end surface;

(f) a second internal, generally U-shaped surface astraddle the axis of said core and diametrically opposed to and axially offset from said first U-shaped surface, said second U-shaped surface communicating with said cylindrical external surface and extending axially between said second internal end surface and the plane of said central internal surfaces, all of said internal surfaces cooperating within said body to form an internal cavity continuous between said axial holes and including a space extending axially of said body and having a diameter sufficiently large to rotationally receive the splined segment of said spindle.

5. A one-piece spool according to claim 4 in which the material forming at least one of said U-shaped surfaces is configured to define a film strip receiving slot communicating with the adjacent cylindrical external surface of said core.

6. A spool according to claim 5 wherein the material forming said core is configured to define a lug adjacent said film strip receiving slot and adapted to engage a perforation of said film strip, ind wherein said cylindrical external surface is configured to define a chamfer adjacent said web receiving slot to permit the end portion of a film strip inserted into said slot to rest in said slot at an angle oblique to the core radius intersecting the center of said slot.

7. A hollow winding core molded in one piece and of approximately cylindrical external configuration, said core being adapted to be rotatably supported on a spindle that extends through axial holes formed in each end of the core and has a segment with a radially projecting spline disposed between the core ends and the internal surfaces of the material forming said core defining first and second recesses extending radially into said core, each of said recesses being circumferentially and axially offset from the other and axially offset from both of said ends, and the axially external ends of each of said recesses directly communicating respectively with opposite ones of said axial holes, and the axially internal ends of each of said recesses being co-planar and partially coextensive with one another, and said first and second recesses directly communicating with each other and being so dimensioned as to form within said core a cavity continuous between said axial holes and providing sufficient space for rotatably receiving the splined segment of said spindle.

8. The core of claim 7 wherein said co-planar surfaces are canted with respect to a plane normal to the axis of the core.

9. The core of claim 7 wherein said axial holes in the ends of the core are configured to define splines respectively different for each said axial hole.

10. The core of claim 7 including at each end thereof an annular flange molded integrally thereto to form a photographic film spool.

11. The core of claim 7 in which the cross section of each of said recesses in a plane parallel to the axis of said core is substantially rectangular with two sides of said cross section parallel to said axis, and in which the profile of each of said recesses in a plane perpendicular to said axis is substantially U-shaped.

12. The core of claim 7 wherein the material forming the external cylindrical surface of said core is configured to define a slot extending through said external surface and communicating with the internal surface of one of said radial recesses to provide means for securing the end of a web strip to said core.

13. The core of claim 12 wherein the material forming said slot is configured to define tapers thinning the core wall adjacent said slot so that the end portion of said web strip can be positioned in said slot at an angle oblique to the core radius intersecting the center of said slot, and wherein a lug is formed adjacent said slot for engaging a perforation in said web.

14. A photographic film spool molded in one piece and having a hollow core adapted to be coaxially supported on a spindle, a segment of which has a radially projecting spline, said core comprising:

a one-piece molded body whose extremities approximately define right cylinder;

said body being formed to provide a plurality of inwardly-extending intercommunicating recesses opening at spaced locations through the peripheral wall of said core body;

said recesses being arranged side by side but with adjacent recesses having their open peripheral sides located at opposite sides of a median plane containing the axis of said core body and intersecting all of said recesses;

each recess having a depth such that its bottom wall lies on the opposite side of said plane from its open peripheral side;

each recess having at least one side thereof substantially coplanar with and at least partially coextensive with a side of the next adjacent recess;

said recesses conjointly forming a continuous axially-extending internal cavity in said core body, any portion of said cavity being directly accessible from the exterior of said body along a line substantially perpendicular to said plane and passing through the open peripheral side of one of said recesses;

said body being provided at its ends with a pair of axial holes opening into said cavity at the corresponding ends thereof;

said holes being adapted to receive said spindle to support said core body coaxially on said spindle;

and said recesses being of a configuration such that said internal cavity formed thereby is of a size sufficient to rotationally receive the splined segment of said spindle when said core body is thus axially supported on said spindle.

15. An integral spool for motion picture film comprising a hollow hub having flanges centrally mounted at opposed ends thereof, said hub having at least one hub wall portion extending between said flanges and a plurality of circumferentially extending bands forming extensions of said hub wall portion, wherein slots complementary to said bands are formed within said hub at points diametrically opposed to each of said bands and wherein at least one of said plurality of bands is positioned on the opposite side of said hub from at least one other of said plurality of bands, at least one of said bands having an axially extending slot therein to permit film to enter said hollow hub.

16. The film spool of claim 15 wherein said wall portion and said bands define inner and outer peripheral surfaces, the inner peripheral surface defining one side of said axially extending slot being substantially flat so as to permit film entering said slot to normally lie against said flat surface.

17. A spool constructed in accordance with claim 15, having means on said hub adjacent said axially extending slot for gripping a strip of film.

18. An integral spool for motion picture film comprising a hollow hub having flanges centrally mounted at opposed ends thereof, said hub having at least one hub wall portion extending between said flanges and a plurality of circumferentially extending bands forming extensions of said hub wall portion, wherein slots complementary to said bands are formed within said hub at points diametrically opposed to each of said bands and wherein at least one of said plurality of bands is positioned on the opposite side of said hub from at least one other of said plurality of bands, at least one of said bands having an axially extending slot therein to permit film to enter said hollow hub, and tooth means integrally formed in said hub adjacent said axially extending slot for retaining a strip of film within said slot.

19. The film spool of claim 18 wherein said hub wall portion and said bands define inner and outer peripheral surfaces, the inner peripheral surface adjacent one side of said axially extending slot being substantially flat so as to permit film entering said slot to normally lie against said flat surface.

No references cited.

GEORGE F. MAUTZ, *Primary Examiner.*

U.S. Cl. X.R.

242—71.8, 74, 118.7